United States Patent
Kekre et al.

(10) Patent No.: US 7,293,146 B1
(45) Date of Patent: Nov. 6, 2007

(54) METHOD AND APPARATUS FOR RESTORING A CORRUPTED DATA VOLUME

(75) Inventors: Anand A. Kekre, Pune (IN); John A. Colgrove, Los Altos, CA (US); Oleg Kiselev, Palo Alto, CA (US); Ronald S. Karr, Palo Alto, CA (US)

(73) Assignee: Symantec Corporation, Cupertino, CA (US)

( * ) Notice: Subject to any disclaimer, the term of this patent is extended or adjusted under 35 U.S.C. 154(b) by 262 days.

(21) Appl. No.: 11/134,932

(22) Filed: May 23, 2005

Related U.S. Application Data

(63) Continuation of application No. 10/254,753, filed on Sep. 25, 2002, now Pat. No. 6,912,631.

(51) Int. Cl.
*G06F 12/00* (2006.01)

(52) U.S. Cl. .................. 711/162; 711/105; 711/111; 711/165

(58) Field of Classification Search ............... 711/105, 711/111, 162, 165
See application file for complete search history.

(56) References Cited

U.S. PATENT DOCUMENTS

| | | | |
|---|---|---|---|
| 5,155,824 A | 10/1992 | Edenfield et al. ............ 395/425 |
| 5,497,483 A | 3/1996 | Beardsley et al. ........... 395/575 |
| 5,506,580 A | 4/1996 | Whiting et al. ................ 341/51 |
| 5,532,694 A | 7/1996 | Mayers et al. .................. 341/67 |
| 5,574,874 A | 11/1996 | Jones et al. .................... 395/376 |
| 5,649,152 A | 7/1997 | Ohran et al. .................. 395/441 |
| 5,778,395 A | 7/1998 | Whiting et al. ............... 707/204 |
| 5,835,953 A | 11/1998 | Ohran .......................... 711/162 |
| 5,907,672 A | 5/1999 | Matze et al. ............ 395/182.06 |
| 6,073,222 A | 6/2000 | Ohran .......................... 711/162 |
| 6,085,298 A | 7/2000 | Ohran .......................... 711/162 |
| 6,141,734 A | 10/2000 | Razdan et al. ............... 711/144 |
| 6,189,079 B1 | 2/2001 | Micka et al. ................. 711/162 |
| 6,269,431 B1 * | 7/2001 | Dunham ....................... 711/162 |
| 6,282,610 B1 | 8/2001 | Bergsten ....................... 711/114 |
| 6,341,341 B1 | 1/2002 | Grummon et al. ........... 711/162 |
| 6,353,878 B1 | 3/2002 | Dunham ....................... 711/162 |
| 6,434,681 B1 | 8/2002 | Armangau .................... 711/162 |
| 6,460,054 B1 | 10/2002 | Grummon .................... 707/204 |
| 6,564,301 B1 | 5/2003 | Middleton .................... 711/144 |
| 6,591,351 B1 | 7/2003 | Urabe et al. .................. 711/162 |
| 6,912,629 B1 * | 6/2005 | West et al. .................... 711/161 |
| 2003/0041220 A1 | 2/2003 | Peleska ......................... 711/162 |

* cited by examiner

*Primary Examiner*—Reba I. Elmore
(74) *Attorney, Agent, or Firm*—Campbell Stephenson LLP

(57) ABSTRACT

Disclosed is a method and apparatus for restoring a corrupted data volume. In one embodiment, the method includes creating a backup copy of the data volume before the data volume is corrupted. Data transactions that modify the contents of the data volume are stored in a transaction log. After detection of the data corruption, a virtual copy of the backup copy is created. Thereafter, select data transactions stored in the transaction log, are applied to the virtual copy. Data of the corrupted data volume is then overwritten with data of the backup copy and data of the virtual copy after applying data transactions to the virtual copy.

17 Claims, 7 Drawing Sheets

METHOD AND APPARATUS FOR RESTORING A CORRUPTED DATA VOLUME

CROSS-REFERENCE TO RELATED APPLICATIONS

The present patent application is a continuation of U.S. patent application Ser. No. 10/254,753, filed on Sep. 25, 2002 now U.S. Pat. No. 6,912,631, entitled "METHOD AND APPARATUS FOR RESTORING A CORRUPTED DATA VOLUME" and is incorporated by reference herein in its entirety and for all purposes.

BACKGROUND OF THE INVENTION

Many businesses employ large-scale data processing systems. FIG. 1 illustrates relevant components of an exemplary large-scale data processing system 10. More particularly, FIG. 1 shows large-scale data processing system 10 having a host computer system 12, a transaction log memory 14, a primary data storage system 16, and a secondary data storage system 18. Primary and secondary data storage systems 16 and 18 include data memories 22 and 24, respectively.

Data memories 22 and 24 store data. More particularly, data memories 22 and 24 store primary and backup data volumes, respectively. The primary data volume is the working volume of large-scale data processing system 10, while the backup data volume is a point-in-time (PIT) copy of the primary data volume. In other words, the backup data volume contains a copy of the primary data volume created at a point in time, the use of which will be more fully described below.

Host computer system 12 accesses data of the primary data volume in response to receiving and processing data transactions or instructions. More particularly, host computer system 12 reads data from, writes data to, or modifies data of the primary data volume in data memory 22 in response to receiving and processing data transactions. Host computer system 12 typically receives data transactions that are generated by software applications executing on computer systems (not shown) coupled to the host computer system 12. Host computer system 12 may also receive data transactions from operators, via an interface (not shown). For purposes of explanation, the operational aspects of large-scale data processing system 10 will be described with respect to host computer system 12 receiving data transactions solely from software applications executing on computer systems. As will be more fully described below, a copy of each transaction that writes to or modifies data of the primary data volume is stored in transaction log memory 14.

Host computer 12 creates a backup volume in data memory 24 to safeguard against data corruption of the primary data volume. Host computer system 12 may also create the backup volume to safeguard against a physical failure of primary data storage system 16 that prevents host computer system 12 access thereto. Host computer system 12 creates the backup data volume in data memory 24 each time host computer system 12 issues a backup command. Creating a backup of the primary data volume is a procedure well known in the art. In essence, the procedure includes host computer system 12 copying data from each block of data memory 22 to a corresponding block of data memory 24 until the entire data content of the primary volume is replicated in data memory 24. For each backup operation after the initial backup, only those blocks of memory 22 which have changed since the previous backup need to be to data memory 24; pointers to unmodified data blocks of memory 22 may be stored. In addition, differences between a data block and its version in the previous backup may be computed so that only the changes to the data block of memory 22 need to be written to memory 24, and almost all data written to memory 24 can be compressed using a lossless compression algorithm to decrease the time needed to successfully complete the backup operation. Host computer 12 typically clears all data transactions stored in transaction log memory 14 each time the primary data volume of data memory 22 is successfully backed up into data memory 24. Accordingly, transaction log memory 14 typically contains only those data transactions received by host computer system 12 after each successful backup of the primary data volume.

Occasionally, host computer system 12 unwittingly receives and executes an invalid or erroneous data transaction. Execution of an invalid or erroneous data transaction results in corruption of data in the primary data volume. When the data corruption is discovered, host computer system 12 can use the backup data volume in data memory 24 to restore the primary data volume to the state it occupied just before data was corrupted. Host computer system 12 will not process data transactions until the primary data volume in data memory 22 is restored. This disrupts operations of businesses using large-scale data processing system 10. Accordingly, it is imperative to restore the primary data volume as soon as possible.

In the restore procedure, host computer system 12 creates a copy of the backup data volume in a third memory (not shown) of a third data storage system (not shown). More particularly, host computer system 12 copies the contents of each block of data memory 24 to a corresponding block in the third memory until the entire contents of the backup volume is replicated in the third memory. The time needed to create the copy of the backup volume in the third memory may be considerable depending on the size of the backup volume.

Once created, host computer system 12 modifies the contents of the backup volume copy by re-executing all transactions held in transaction log memory 14 up to but not including the invalid transaction that caused the data corruption in the primary data volume. After host computer system 12 finishes modifying the copy of the backup, the copy should be identical to the primary volume at the point in time just before host computer system 12 executed the invalid transaction. Host computer system 12 completes the restore process by overwriting each block of data memory 22 with the contents of its corresponding block in the third memory. Overwriting blocks of data memory 22 during the restore process may require a substantial amount of time depending on the size of the modified backup volume copy. Once the primary volume is fully restored, host computer system 12 can resume reading, writing, or modifying data to the primary data volume in accordance with data transactions received after the invalid transaction.

Businesses using large-scale data processing systems such as system 10 seek to restore a corrupted primary data volume as soon as possible in order to resume data transaction processing. Unfortunately, substantial time may be needed during the restore process to copy the entire contents of the backup copy and to overwrite the corrupted primary volume with the contents of the modified backup volume copy.

SUMMARY OF THE INVENTION

Disclosed is a method and apparatus for restoring a corrupted data volume. In one embodiment, the method includes creating a backup copy of the data volume before the data volume is corrupted. Data transactions that modify the contents of the data volume are stored in a transaction log. After detection of the data corruption, a virtual copy of the backup copy is created. Thereafter, select data transactions stored in the transaction log, are applied to the virtual copy. Data of the corrupted data volume is then overwritten with data of the backup copy and data of the virtual copy after applying data transactions to the virtual copy.

BRIEF DESCRIPTION OF THE DRAWINGS

The present invention may be better understood, and its numerous objects, features, and advantages made apparent to those skilled in the art by referencing the accompanying drawings.

FIG. 4 is a block diagram of VM tables created by the host computer system shown in FIG. 2;

FIG. 8 is a block diagram of the VM tables in FIG. 4 after modification thereof;

The use of the same reference symbols in different drawings indicates similar or identical items.

DETAILED DESCRIPTION

The present invention relates to an apparatus and method for restoring a data volume after data thereof is corrupted due to, for example, an incorrect operation performed by software or an operator. More particularly, the present invention relates to an apparatus and method for restoring a corrupted data volume to the state it occupied just prior to an event that corrupted the primary data volume. The present invention will be described with reference to restoring a data volume that was corrupted after execution of an invalid data transaction, it being understood that the present invention should not be limited thereto.

Figure 1:
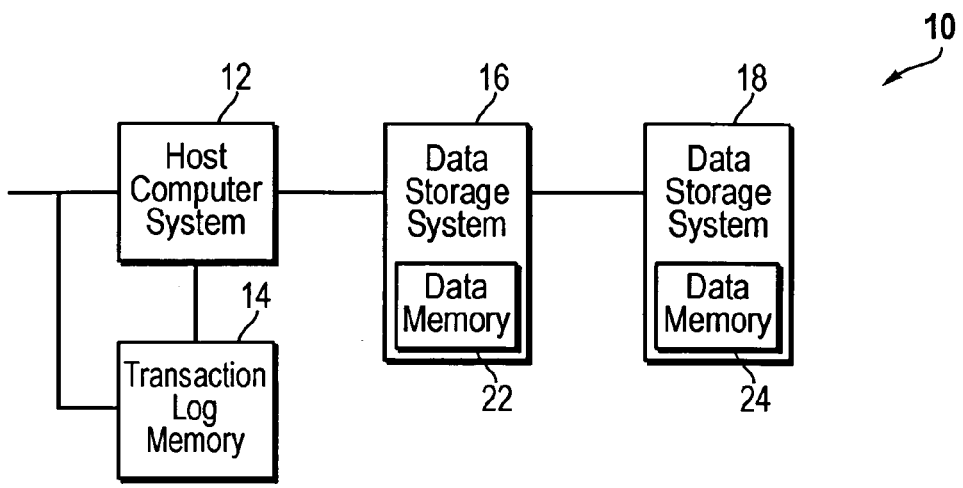
FIG. 1 is a block diagram of a data processing system employing storage subsystems.
Figure 2:
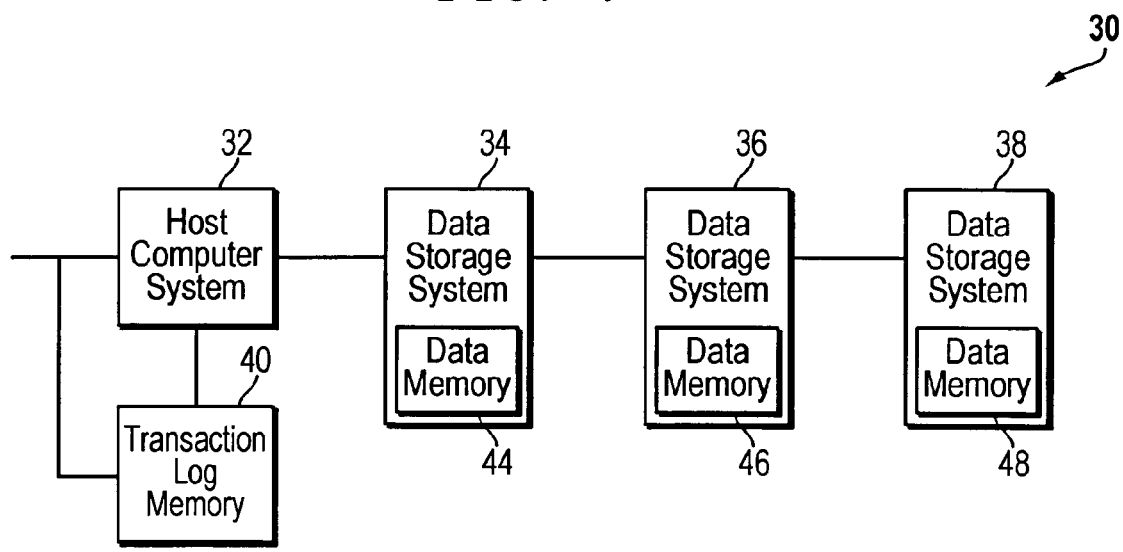
FIG. 2 is a block diagram of a data processing system employing one embodiment of the present invention.

FIG. 2 illustrates (in block diagram form) relevant components of a data processing system 30. Data processing system 30 includes a host computer system 32 coupled to data storage systems 34-38 and a transaction log memory 40. Data storage systems 34-38 include data memories 44-48, respectively. Host computer system 32 can store, access and process data stored in each of the data memories 44-48. FIG. 2 shows host computer system 32 coupled directly to, for example, data storage system 34. The term coupled should not be limited to that shown in FIG. 2. Two devices (e.g., host computer system 12 and data storage system 34) may be coupled together via a third device.

Data memories 44 and 46 store primary and backup data volumes, respectively. The primary data volume is a collection of files that store data, while the backup data volume is a point-in-time (PIT) copy of the primary data volume. While it is said that files store data, in reality data is stored in blocks of data memory 44 allocated to the files. Data memory 48, as will be more fully described, can store a virtual point-of-failure (POF) data volume that can be used to restore the primary data volume in data memory 44 after corruption of data therein. It is noted that the virtual POF data volume can be created as a separate volume in memory 44 or 46. However, for purposes of explanation, virtual POF will be described below as being created in memory 48, it being understood that the present invention should not be limited thereto.

Data memories 44-48 may take form in one or more dynamic or static random access memories, one or more magnetic or optical data storage disks, or; one or more magnetic or optical data storage tapes. Data memories 44-48 should not be limited to the foregoing hardware components. Rather, data memories 44-48 may take form in any hardware, software, or combination of hardware and software in which data may be persistently stored and accessed. Data memories 44-48 may take form in a complex construction of several hardware components operating under the direction of software. The data memories may take form in mirrored hardware. It is further noted that the present invention may find use with many types of redundancy/reliability systems. For example, the present invention may be used with Redundant Array of Independent Disks (RAID) systems. Moreover, the present invention should not be limited to use in a disc array or in the host node of a data storage network. The present invention may find use in a storage switch or in any of many distinct appliances that can be used with a data storage system.

Figure 3:
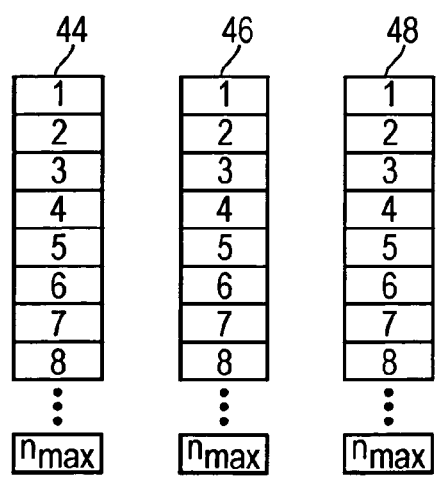
FIG. 3 are block diagrams illustrating memory structure of storage systems shown in FIG. 2.

FIG. 3 represents (in block diagram form) a logical structure of data memories 44-48. Each of the data memories 44-48 includes $n_{max}$ memory blocks into which data can be stored. For purposes of explanation, each block of data memory 44 is allocated to and stores data of the primary data volume. Although the memory blocks are shown contiguous in FIG. 3, the present invention should not be limited thereto. For example, memory blocks allocated to the primary data volume may be distributed across several memory devices that form data memory 44. Moreover, it is noted that any or all of memories 44-48 may have more than $n_{max}$ memory blocks. In this alternative embodiment the first $n_{max}$ blocks of memories 44-48 are dedicated for storing the primary, backup, and virtual POF data volumes, respectively.

Corresponding memory blocks in data memories 44-48 are equal in size. Thus, memory block 1 of data memory 44 is equal in size to memory block 1 of data memories 46 and 48. Each of the memory blocks within memory 44 may be equal in size to each other. Alternatively, the memory blocks in data memory 44 may vary in size.

As noted above, each memory block 1 through $n_{max}$ of data memory 44 contains data of the primary data volume. Host computer system 32 reads data from, writes data to, or modifies data of the primary volume in data memory 44 in response to receiving and executing data transactions or instructions. For purposes of explanation, host computer system 32 externally receives data transactions, it being understood that the present invention should not be limited thereto. Also, for purposes of explanation, the data transactions received by host computer system 32 are generated by software applications executing on one or more computer systems (not shown) coupled to host computer system 32, it being understood that the present invention should not be limited thereto.

The primary data volume is the "working" volume of data processing system 30. Data memory 46 can store a point-in-time (PIT) backup copy of the primary data volume stored in data memory 44. In one embodiment, host computer system 32 creates a virtual PIT backup copy in data memory 46 according to the methods described in copending U.S. patent application Ser. No. 10/143,059 entitled Method and Apparatus for Creating a Virtual Data Copy (incorporated herein by reference), each time host computer system 32 receives or internally generates a backup command. The virtual PIT backup copy in data memory 46 can eventually be transformed to an actual PIT copy of the primary data volume using a background copying process. However, the present invention allows immediate access to the primary data volume in data memory 44 (and the virtual PIT backup copy in data memory 46) before the virtual PIT backup is transformed to an actual backup. This concept will be more fully described below and in copending U.S. patent application Ser. No. 10/143,059.

Initially (i.e., before any backup copy is created in data memory 46) data memory 46 contains no data. When host computer system 32 first creates a virtual PIT backup copy in data memory 46, host computer system 32, in one embodiment, creates a pair of valid/modified (VM) tables such as tables VM 52 and 54 illustrated in FIG. 4. VM tables 52 and 54 correspond to the primary data volume and the virtual PIT backup copy thereof, respectively. Hence, VM tables 52 and 54 may be referred to as primary volume and PIT backup VM tables 52 and 54, respectively. VM tables 52 and 54 may be stored in memory of host computer system 32 or elsewhere. VM tables 52 and 54 include $n_{max}$ entries of two bits each in one embodiment. Each entry of primary volume VM table 52 corresponds to a respective block of data memory 44, while each entry of PIT backup VM table 54 corresponds to a respective block of memory 46. In an alternative embodiment, each entry of primary volume VM table 52 may correspond to a respective group of blocks of data memory 44, while each entry of PIT backup VM table 54 corresponds to a respective group of blocks of data of memory 46.

The first and second bits in each entry are designated $V_n$ and $M_n$, respectively. $V_n$ in each entry, depending on its state, indicates whether the corresponding block n of the associated memory contains valid data. For example, when set to logical 1, $V_2$ of primary volume VM table 52 indicates that block 2 of data memory 44 contains valid data, and when set to logical 0, $V_2$ of primary volume VM table 52 indicates that block 2 of data memory 44 contains no valid data. $M_n$ in each entry, depending upon its state, indicates whether data within the corresponding block n of the associated memory has been modified. For example, when set to logical 1, $M_3$ of primary volume VM table 52 indicates that block 3 of data memory 44 contains data modified since creation of primary volume VM table 52. When set to logical 0, $M_3$ or primary volume VM table 52 indicates that block 3 of data memory 44 contains data which has not been modified since creation of primary volume VM table 52.

When VM tables 52 and 54 are first created, each entry of PIT backup VM table 54 is set to logical 0 thus indicating that data memory 46 contains no valid or modified data. For purposes of explanation, it is presumed that each block of data memory 44 contains valid data. Accordingly, $V_n$ of each entry in primary volume VM table 52 is initially set to logical 1. Lastly, $M_n$ of each entry in primary volume VM table 52 is initially set to logical 0 thus indicating that at the time the backup command issues, no data in data memory 44 has been modified.

Figure 5:
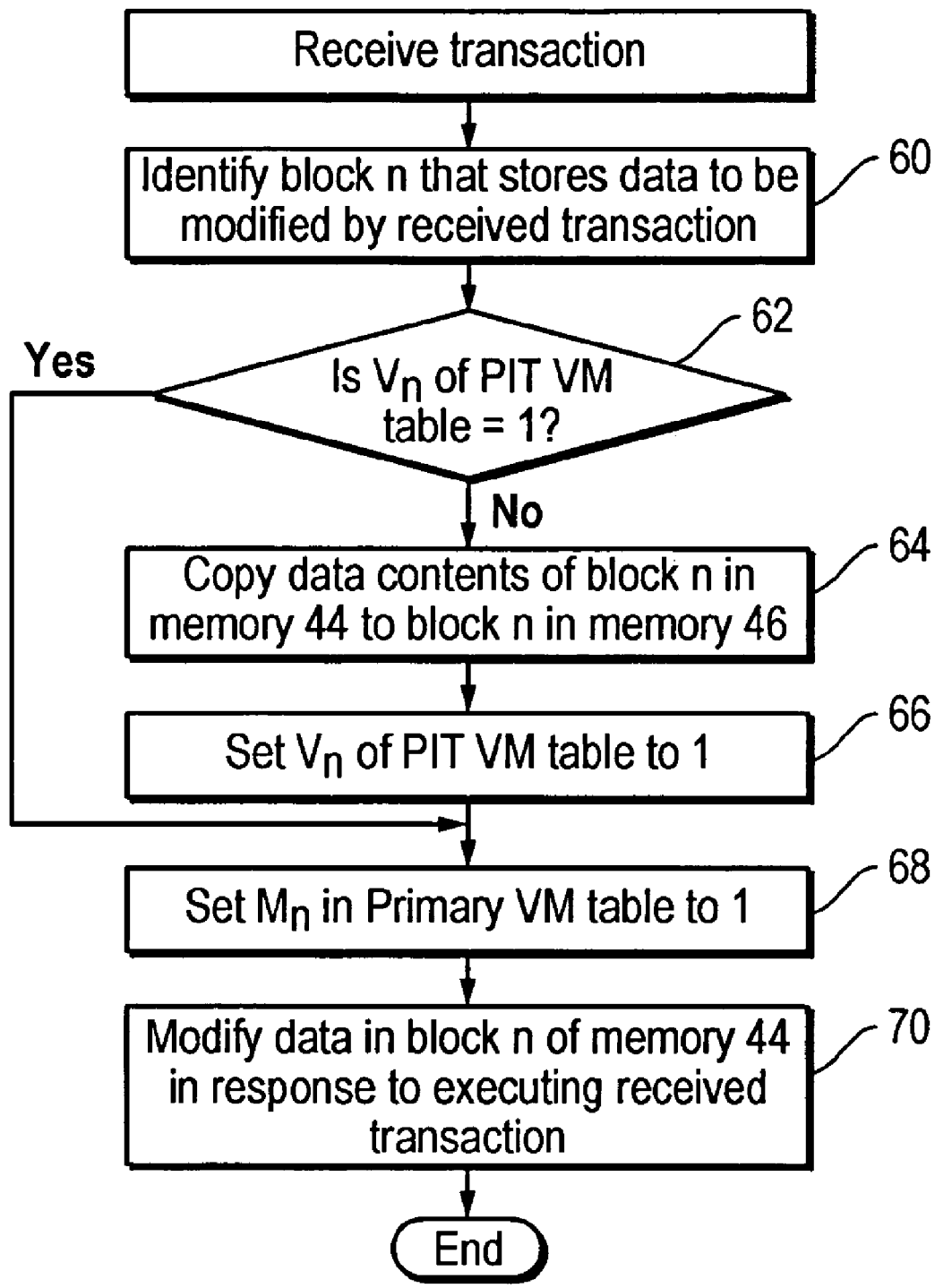
FIG. 5 is a flow chart illustrating operational aspects of executing transactions after creation of a virtual back up copy of the primary data volume.

After VM tables 52 and 54 are initiated, host computer system 32 may run a background process to copy data contents of data memory 44 to data memory 46 in a block by block manner. Eventually, this background process will completely copy the contents of data memory 44 into data memory 46, thus transforming the virtual PIT backup copy in data memory 46 into an actual PIT backup copy. However, before the background copying process is started, or before the background copying process is completed, host computer system 32, in accordance with data transactions received thereby, can read, write, or modify data of the primary volume in data memory 44. FIG. 5 illustrates relevant aspects of host computer system 32 modifying data in the primary data volume immediately after creation of the virtual PIT back up. It is noted that in one embodiment, the present invention can be implemented without the background copying process. In this embodiment, memory 46 contains blocks of data copied from memory 44 before modification thereof.

Initially, host computer system 32 receives a data transaction that modifies data of the primary data volume. For purposes of explanation, the phrase "modifying data in the primary volume" includes writing new data to the primary volume. A copy of the received transaction is stored in transaction log 40. Moreover, transaction log 40 stores transactions in the order in which they were received.

With continued reference to FIG. 5, host computer 32, in step 60, accesses meta data to identify the block n of data memory 44 allocated to store the data to be modified by the received data transaction. It is noted that more than one block in data memory 44 may be allocated to store the data to be modified. For purposes of explanation, it is presumed that the newly received data transaction is directed to modifying data contained a single block n of data memory 44.

Once memory block n is identified, host computer system 32 accesses PIT backup VM table 54 to determine whether the data contents of block n of data memory 46 were previously copied to block n of data memory 46. In one embodiment of this step, host computer system 32 determines whether $V_n$ of the PIT backup VM table 54 is set to logical 1. Block n of data memory 46 will contain valid data, (i.e., $V_n$ is set to logical 1) if the contents of block n in data memory 44 were previously copied to block n of data memory 46 by the background copying process mentioned above, or in response to host computer system 32 executing a previously received transaction to modify data of block n of data memory 44. If $V_n$ of PIT VM table 54 is set to logical 0, then the process continues to step 64 where, as shown, host computer system 32 copies the contents of block n of data memory 44 to block n of data memory 46. Thereafter, in step 66 host computer system 32 sets $V_n$ of PIT VM table 54 to logical 1. It is noted that the order of steps 64 and 66 can be reversed in order in an alternative embodiment. In this alternative embodiment, however, if a crash occurs after the step of setting $V_n$ of PIT VM table 54 to logical 1 but before data of block n in memory 44 is copied to block n of memory 46, then PIT VM table 54 may indicate that block n of memory 46 contains valid data when in fact block n of memory 46 contains no data at all. Host computer system 32 may be configured to check for and correct for such inconsistencies between PIT VM table 54 and memory 46 when host computer system 32 recovers from the crash.

After step 66, the process continues to step 68 where host computer system 32 sets $M_n$ in primary VM table 52 to 1. Thereafter, in step 70, host computer system 32 executes the received data transaction and modifies data in block n of data memory 44. It is noted that the order of steps 68 and 70 may be reversed.

Host computer system 32 may unwittingly corrupt data in the primary data volume in response to receiving and executing an invalid transaction. When a data corruption is discovered, host computer system 32 initiates a restore process in accordance with one embodiment of the present invention. This process involves creating a virtual point-of-failure (POF) copy of the primary volume in data memory 48 of data storage system 38 (FIG. 2). The POF copy is a copy of the primary data volume in data memory 44 just before data corruption thereof. Host computer system 32, using the virtual POF copy created in data memory 48, eventually restores the primary volume to the state it occupied just before such host computer system executed the invalid instruction.

Figure 6:
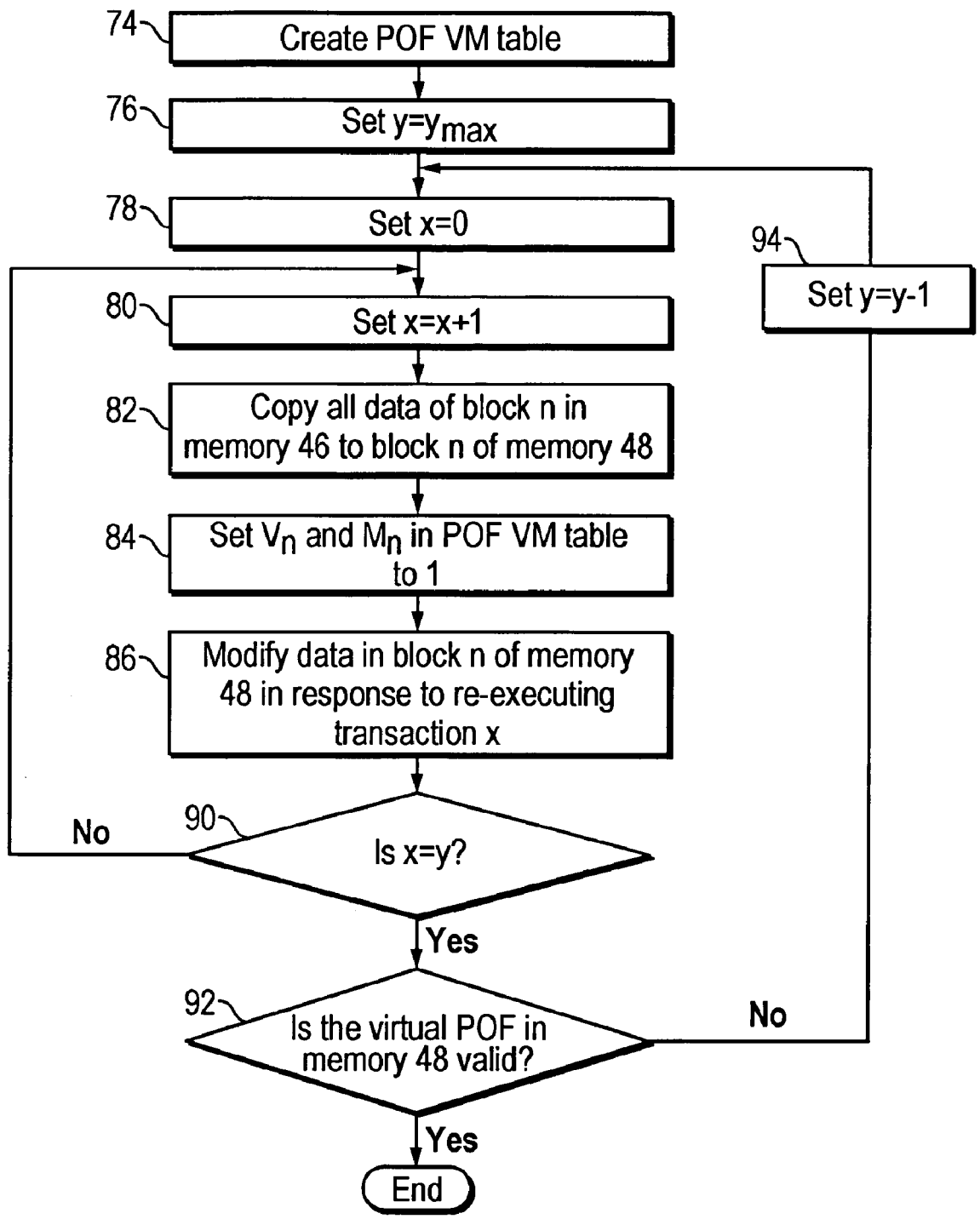
FIG. 6 is a flow chart illustrating operational aspects of creating a valid, virtual point of failure data volume.

Host computer system 32 creates the virtual POF copy of the primary data volume by first creating a virtual copy of the backup in data memory 46 and subsequently modifying data of the virtual copy of the backup as a result of re-executing data transactions stored within transaction log memory 40 up to but not including the invalid instruction which caused the primary data volume corruption. FIG. 6 is a flow chart illustrating operational aspects of creating the virtual POF copy according to one embodiment of the present invention. Initially, host computer system 32 creates POF VM table 72 (FIG. 4) as shown in step 74 of FIG. 6. POF VM table 72 includes $n_{max}$ entries like VM tables 52 and 54. Each entry of POF VM table 72 corresponds to a respective block in data memory 48 and includes $V_n$ and $M_n$ bits. Each $V_n$ bit of POF VM table 72 is initially set to logical 0, indicating that data memory 48 initially contains no valid data. Each $M_n$ bit of POF VM table 72 is initially set to logical zero, indicating that data memory 48 initially contains no modified data.

Figures 4, 8:
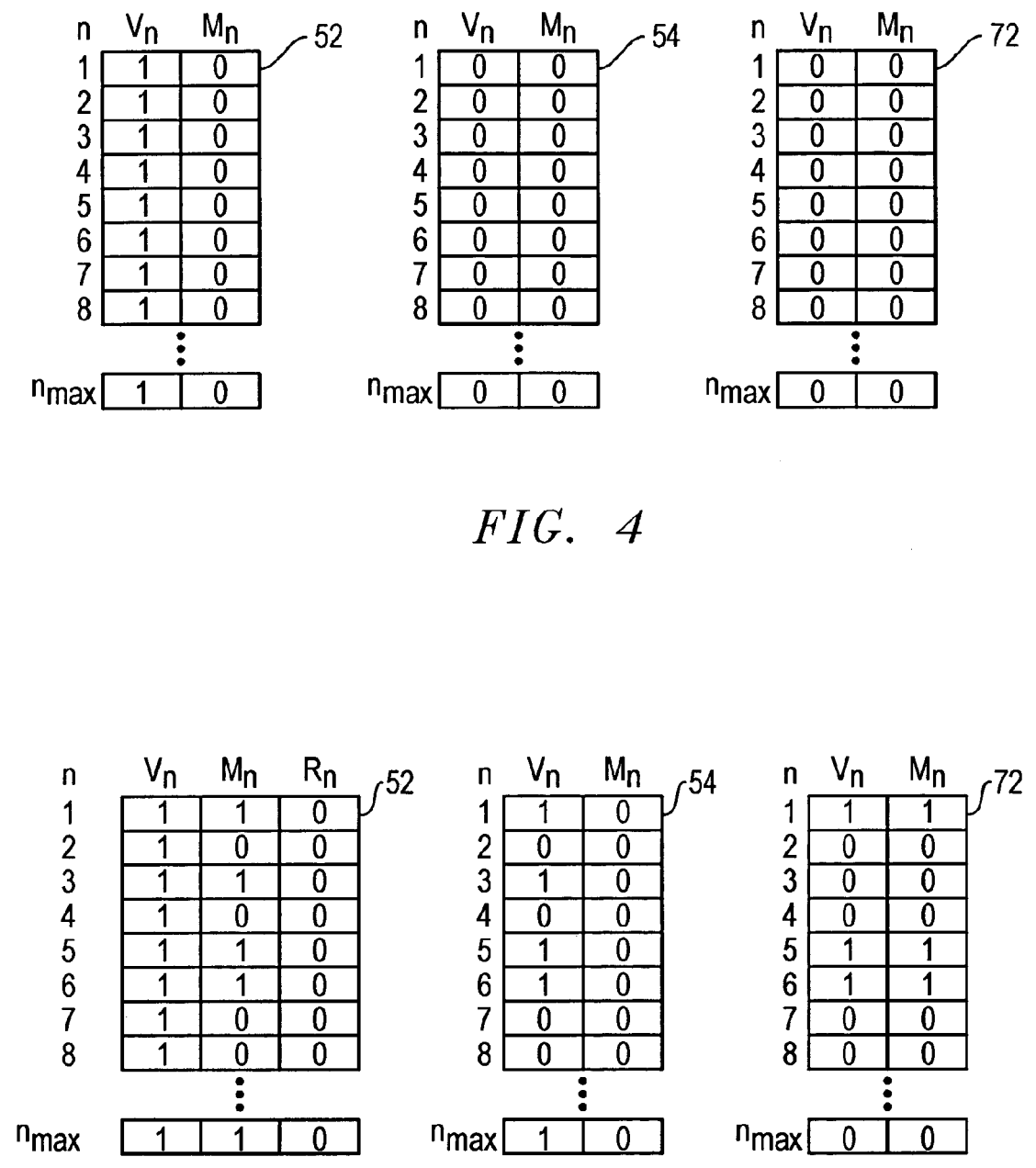

With continued reference to FIGS. 4 and 6, in step 76, host computer system 32 sets a dummy variable y to $y_{max}$ where $y_{max}$ is the total number of data transactions stored within transaction log memory 40. Again, it is noted that transaction log 40 stores only those transactions that were received after the last back-up copy was created in data memory 46. In steps 78 and 80, host computer system 32 sets a second dummy variable x to 0 and increments dummy variable x by 1.

Host computer system 32 reads the $x^{th}$ transaction from transaction log memory 40 and identifies block n of data memory 44 allocated to store data modified by transaction x. Once block n is identified, host computer system 32 copies all data of block n from data memory 46 to block n of data memory 48 as shown in step 82. In step 84, host computer system 32 sets $V_n$ and $M_n$ in POF VM table 72 to logical 1. It is noted that $V_n$ in POF VM table 72 need not be set in step 84; however, for purposes of explanation, $V_n$ will be set in step 84.

In step 86, host computer system 32 modifies data in block n of data memory 48 in response to re-executing transaction x. Host computer system 32 then compares dummy variables x and y in step 90. If all transactions stored in memory log 40 have been re-executed by host computer system 32, up to and including transaction y, the process continues to step 92 where it is determined whether the contents of the virtual POF copy in data memory 48 are valid. The POF copy contained in data memory 48 at step 92 will be valid if data in data memory 48 is modified in response to host computer system 32 re-executing all data transactions stored in transaction log memory 40 up to but not including the invalid instruction that caused the corruption of the primary volume in data memory 44. If the contents of the virtual copy in data memory 48 are not valid, then dummy variable y is decremented by 1 in step 94 and the process returns to step 76 where dummy variable x is reset to 0. Steps 80-92 are repeated. Eventually, a valid, virtual POF copy is created in data memory 48 and the process of FIG. 6 ends. It is noted that host computer system 32 need not copy the data contents of each and every block of data memory 46 into a corresponding block of data memory 48 in order to create the valid, virtual POF copy according to the process illustrated in FIG. 6.

Figure 7:
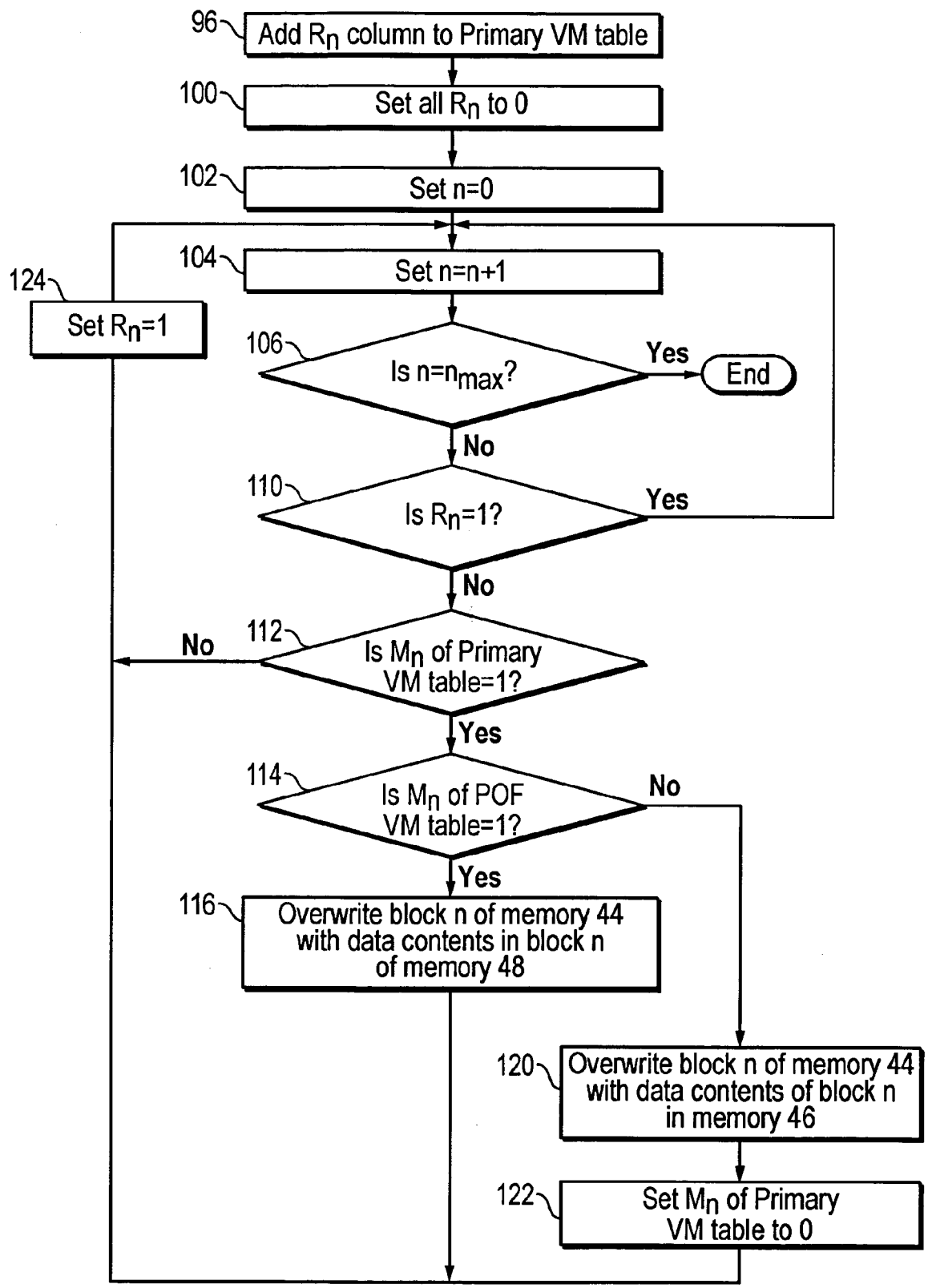
FIG. 7 is a flow chart illustrating operational aspects of restoring the primary data volume to the valid, virtual point of failure volume.

Once the valid, virtual POF copy is created in data memory 48, host computer system 32 can restore the primary volume in data memory 44 to its state just before corruption of data therein. FIG. 7 illustrates operational aspects of one embodiment for restoring the primary data volume in data memory 44. In this embodiment, host computer system 32 first adds a third column designated $R_n$ to primary volume VM table 52 as shown in step 96. $R_n$ need not be added to primary VM table 52. $R_n$ could be a table separate from VM table 52, or $R_n$ could be added to VM table 54. However, for purposes of explanation, $R_n$ is added as a column to primary VM table 52.

$R_n$ indicates whether block n of data memory 44 has been restored. Initially, all $R_n$ bits are set to logical 0 in step 100 thus indicating that none of the blocks of data memory 44 have been restored. FIG. 8 illustrates VM tables 52, 54 and 72 just after creation of the valid, virtual POF copy in data memory 48 and with column $R_n$ added to primary volume VM table 52.

With continued reference to FIGS. 7 and 8, in steps 102 and 104, host computer system 32 sets n to 0 and increments n by 1. Host computer system 32 then compares the current state of n to $n_{max}$ to determine whether the restore process has completed. If $n=n_{max}$, the process ends and host computer system 32 may delete column $R_n$ from primary VM table 52. Otherwise the process continues to step 110 where host computer system 32 checks primary VM table 52 and determines the state of $R_n$. If $R_n$ is equal to 1, then block n of data memory 44 has been previously restored and the process returns to step 104 where n is incremented by 1. If host computer system 32 determines that block n has not yet been restored (i.e., $R_n=0$), then the process continues to step 112 where host computer system 32 checks the state of $M_n$ of primary volume VM table 52. If $M_n$ is set to logical 0, then the contents of block n of data memory 44 have not been modified since the PIT backup was last created and the process returns to step 104 where n is incremented by 1 after $R_n$ is set to logical 1 in step 124. If $M_n$ is equal to logical 1, then data in block n of data memory 44 has been modified since the last backup copy was created in data memory 46. To return the primary data volume contained within data memory 44 to its state just prior to data corruption, each block within data memory 44 that was modified since the creation of the last backup copy in data memory 46 should be overwritten with data of a corresponding block within data memory 48 or data memory 46. In one embodiment, whether data in block n of data memory 44 should be overwritten with data of block n of data memory 46 or 48 depends on the state of $M_n$ of POF VM table 72. In step 114, host computer system 32 checks the state of $M_n$ of the POF VM table 72. If $M_n$ is set to logical 1, block n in data memory 44 is then overwritten with data of block n of data memory 48 as shown in step 116. If $M_n$ of POF VM table 72 is set to logical 0, then in step 120 host computer system 32 overwrites block n data of data memory 44 with data from block n of data memory 46. If block n of data memory 44 is overwritten with data from block n of data memory 46, host computer system 132 clears $M_n$ of the primary VM table 52 to logical 0 in step 122. The process then returns to step 104 after $R_n$ is set to logical 1 in step 124.

Using the process illustrated in FIG. 7, the primary data volume stored within data memory 44 is restored to its state just prior to data corruption thereof. However, in contrast to the process described in the background section above, host computer system 32 need not delay modifying the primary data volume in data memory 44, according to newly received transactions or transactions received after the invalid transaction that corrupted data, until the process illustrated in FIG. 7 completes. Host computer system 32 can resume executing data transactions as soon as the valid, virtual POF copy is created in data memory 48. In other words, host computer system 32 can resume modifying the primary data volume in data memory 44, according to execution of newly received transactions or transactions received after the invalid transaction that corrupted data, even though data memory 44 may still contain corrupted data.

Figure 9:
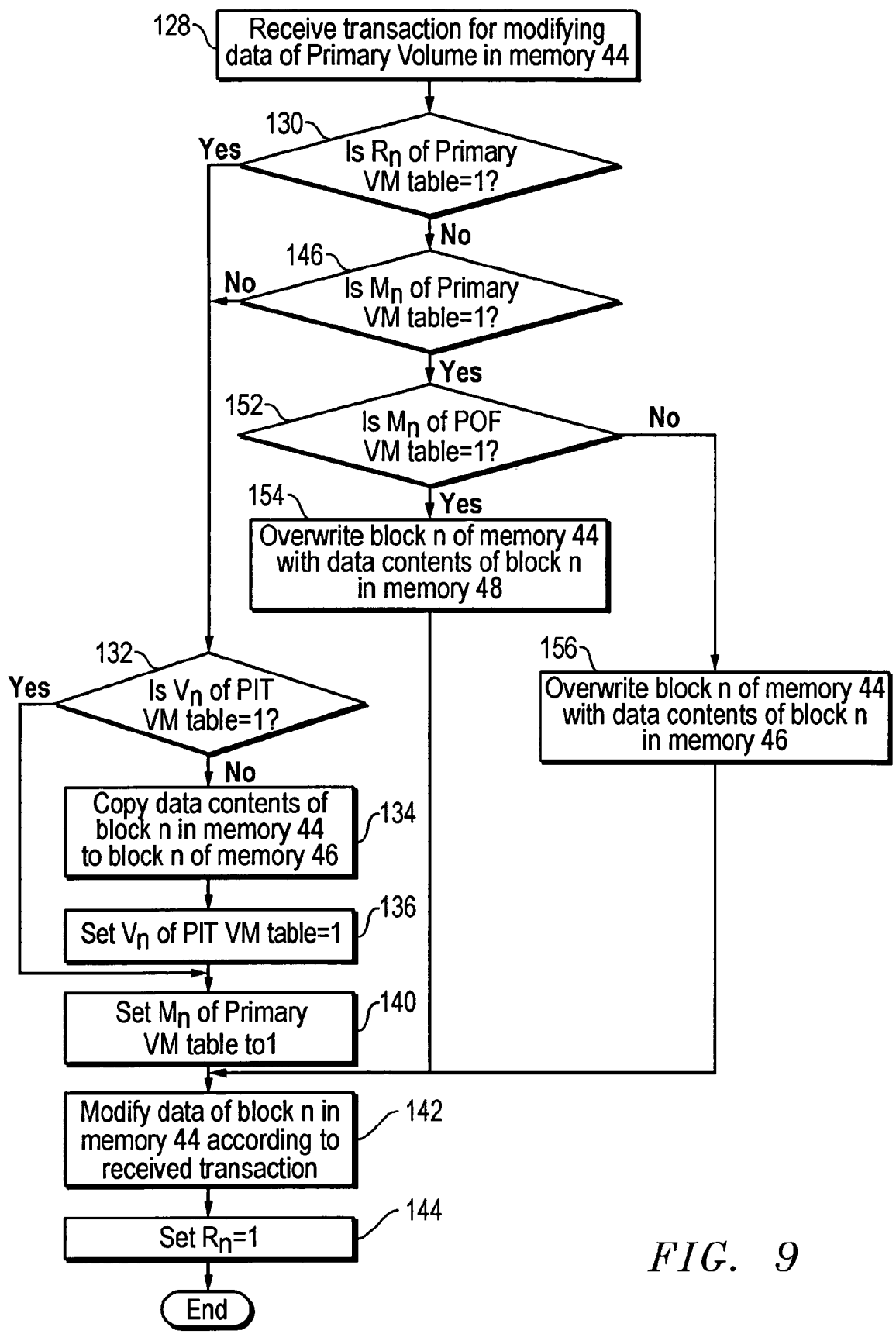
FIG. 9 is a flow chart illustrating operational aspects of executing a transaction to modify data of the primary volume after instant restore thereof.
Figure 10:
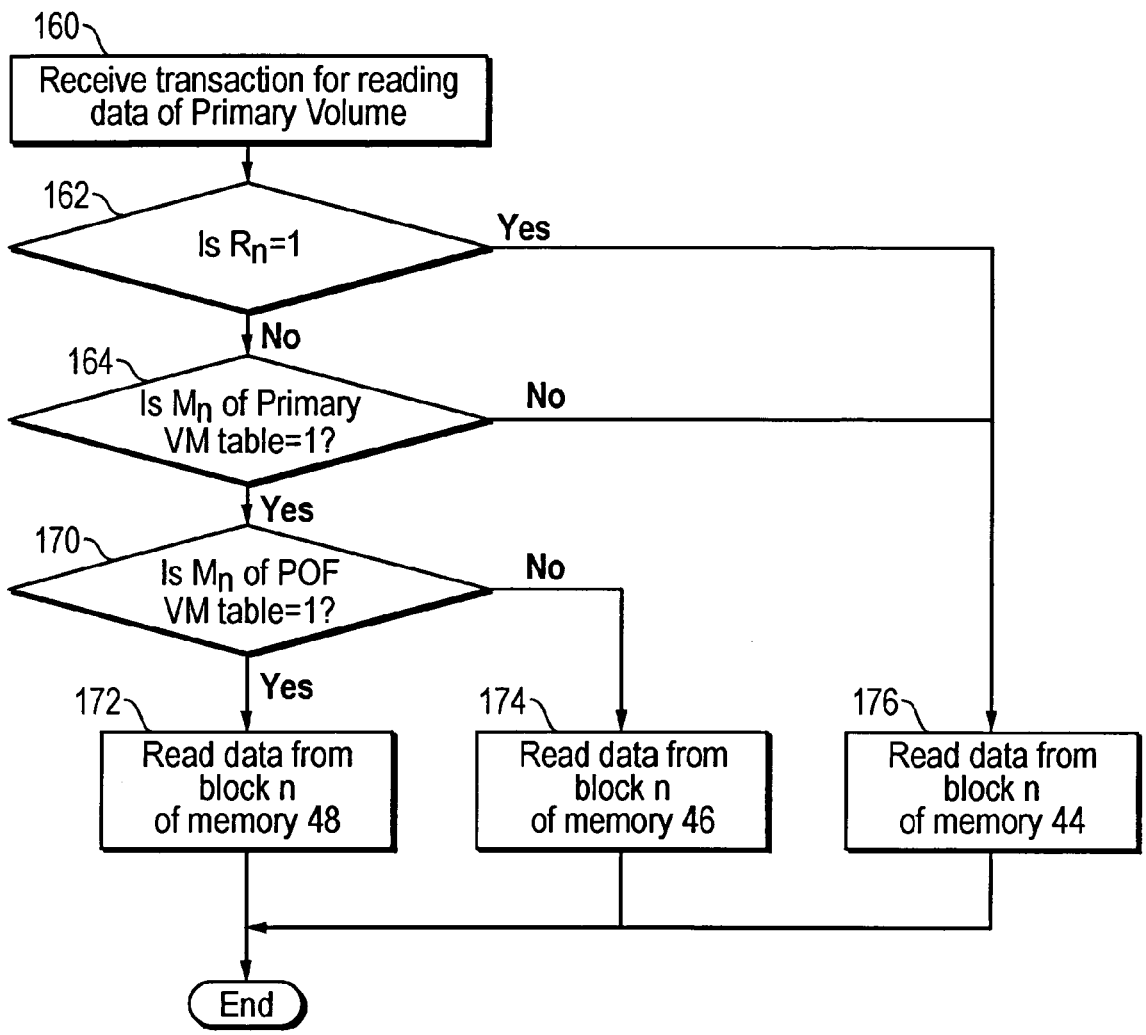
FIG. 10 is a flow chart illustrating operational aspects of executing a transaction to read data of the primary volume after instant restore thereof.

FIGS. 9 and 10 illustrate operational aspects of reading or modifying data of the primary data volume in data memory 44 after the restore process illustrated in FIG. 7 has begun, but before the restore process completes. More particularly, FIG. 9 illustrates operational aspects of host computer system 32 executing a transaction for modifying data of the primary volume contained within data memory 44 before the restore process illustrated in FIG. 7 has completed according to one embodiment of the present invention. In step 128, host computer system 32 receives a data transaction for modifying data of the primary volume in data memory 44. Host computer system 32 then accesses meta data and determines which block n of data memory 44 contains the data to be modified when the received data transaction is executed.

In step 130 host computer system 32 then checks the state of $R_n$ of primary volume VM table 52 (FIG. 8). If $R_n$ is set to logical 1, then the data contents of block n within data memory 44 were previously restored and the process continues to step 132 where host computer system 32 checks the state of $V_n$ of the PIT VM table 54. If $V_n$ of the PIT backup VM table 54 is set to logical 0, then the data contents of block n within data memory 44 must first be copied to block n of data memory 46 before any modifications can be made to data in block n of data memory 44. Accordingly, in steps 134 and 136 host computer system 32 copies the contents of block n of data memory 44 to block n of data memory 46 and sets $V_n$ of the PIT backup VM table 54 to logical 1. Steps 134 and 136 can be reversed in the alternative. Once the contents of block n of data memory 44 is copied into block n of data memory 46, then host computer system 32 sets $M_n$ of the primary VM table 52 to logical 1 and modifies data in block n of data memory 44 in response to executing the received data transaction as shown in steps 140 and 142. In the alternative, $M_n$ of the primary VM table 52 may be set to logical 1 after data is modified in block n of data memory 44. In step 144, host computer system 32 system sets $R_n$ to logical 1 (if not already set to logical 1) thereby indicating that in the future, the contents of block (n) within data memory 44 need not be restored.

If $R_n$ and $V_n$ are set to logical 1 when host computer system 32 checks the primary VM table 52 in steps 130 and 132, there is no need to either restore block n of data memory 44 or copy the contents of block n of data memory 44 into block n of data memory 46 before modifying data of block n of data memory 44. As such, the process continues directly to steps 140-144.

If in step 130, $R_n$ is set to logical 0, then block n of data memory 44 has yet to be restored. It could be the case that block n of data memory 44 need not be restored before data in block n of data memory 44 is modified. To determine whether block n of data memory 44 should first be restored, host computer system 32 checks the status of $M_n$ of primary VM table 52 in step 146. If $M_n$ of primary VM table 52 is set to logical 0, then block n of data memory 44 need not be restored before modification of data therein, and the process continues to step 132. If, however, $M_n$ of the primary volume VM table is set to logical 1 in step 146, then block n must be restored. Host computer system 32 restores block n by overwriting data of block n of data memory 44 with the contents of block n of data memory 48 in step 154 or the contents of block n of data memory 46 in step 156 depending upon the state of $M_n$ in POF VM table 72. More particularly, if $M_n$ in POF VM table 72 is set to logical 1 in step 152, then host computer system 32 overwrites data of block n of data memory 44 with the contents of block n of data memory 48. Otherwise, host computer system 32 overwrites data of block n of data memory 44 with the contents of block n of data memory 46. In step 142 after restoration of block n in data memory 44, host computer system 32 executes the transaction received in step 128 and modifies data of block n within data memory 44.

FIG. 10 illustrates operational aspects of host computer system 32 executing a transaction to read data of the primary volume contained within data memory 44 before the restore process illustrated in FIG. 7 has completed according to one embodiment of the present invention. In step 160, host computer system 32 receives a transaction for reading data from the primary volume in data memory 44. Host computer system 32 accesses meta data and determines which block n of data memory 44 contains the data to be read when the received transaction is executed.

Host computer system 32 checks the state of $R_n$ in primary VM table 52 in step 162. If $R_n$ is set to logical 1, then block n of the data memory 44 has been restored and data can be read therefrom in response to executing the received read data transaction as shown in step 164. If in step 162, $R_n$ is set to logical 0, then block n of data memory 44 has not been restored at the time the transaction is received by host computer system 32. However, even though block n of data memory 44 has not been restored, sometimes block n of data memory 44 need not be restored before data thereof is read. To determine whether block n of data memory 44 should first be restored, host computer system 32 checks the status of $M_n$ of primary VM table 52 in step 164. If the state of $M_n$ is equal to logical 0, then data within block n of data memory 44 was not modified since the last backup was created in data memory 46. As such, host computer system 32 should read data from block n of data memory 44 as shown in step 176. If $M_n$ of POF VM table 72 is set to logical 1 in step 170, then host computer system 32 reads data from block n of data memory 46 or 48 depending on the state of $M_n$ of POF VM table 72.

FIGS. 7-10 illustrate one method by which a primary data volume can be restored to the state it occupied just prior to data corruption thereof. Importantly, using this embodiment, host computer system 32 can resume reading, writing, or modifying data of the primary volume in data memory 44 instantly after creation of the valid, virtual copy in data memory 48. Accordingly, host computer system 32 can execute data transactions sooner when compared to the large-scale data processing system 10 described in the background section above.

It is noted that restoring the primary data volume in memory 44 may not result in an exact copy of the primary data volume just before data corruption thereof. More particularly, the data in memory 44 after restore will be identical to the data in memory before corruption, but data after restore the data may not be stored in the same physical locations in memory 44. In other words, the allocation of blocks in memory 44 to files of the primary volume after restore may be different when compared to the allocation of memory blocks prior to restoration. Any difference in memory block allocation, however, is transparent to applications that generate the read or write data transactions. Thus, the restore process described above should result in an exact copy of the logical contents of the primary data volume just before data corruption.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
creating a backup copy of a data volume before the data volume is corrupted;
creating a virtual copy of the backup copy after the data volume is corrupted;
modifying data of the virtual copy according to one or more transactions stored in a transaction log;
overwriting data of the corrupted data volume with modified data of the virtual copy.

2. The method of claim 1 wherein the corrupted data volume is overwritten modified data of the virtual copy until the data volume is in a data state that existed between a time the backup copy was created and a time the data volume was corrupted.

3. The method of claim 1 further comprising overwriting data of the corrupted data volume with data of the backup copy.

4. The method of claim 3 wherein the corrupted data volume is overwritten with data of the backup copy and modified data of the virtual copy until the data volume is in a data state that existed just before the data volume was corrupted.

5. The method of claim 3 wherein the corrupted data volume is overwritten with data of the backup copy and modified data of the virtual copy until the data volume is in a data state that existed between a time the backup copy was created and a time the data volume was corrupted.

6. A method comprising:
creating copies of first and second data portions of a data volume;
modifying data of the first and second data portions of the data volume according to first and second transactions, respectively, wherein the copies of the first and second data portions are created before modifying data of the first and second data portions of the data volume according to the first and second transactions, respectively;
creating a copy of the first data portion copy;
modifying data of the copy of the first data portion copy according to the first transaction;
overwriting the modified first data portion of the data volume with the modified data of the copy of the first data portion copy.

7. The method of claim 6 further comprising overwriting the second volume portion with the second data volume portion copy after the modification of data of the second data portion of the volume in accordance with the second transaction.

8. The method of claim 6 further comprising:
generating a third transaction for modifying data of the first data portion of the data volume, wherein the modified first data portion of the volume is overwritten with the modified data of the copy of the first data portion copy in response to generation of the third transaction;
modifying data of the first data portion of the volume in accordance with the third transaction after overwriting the modified first data portion of the data volume with the modified copy of the first data portion copy.

9. The method of claim 8 further comprising:
generating a fourth transaction to modify data of the second data portion of the volume, wherein the second data portion of the volume is overwritten with the second data portion copy stored response to generation of the fourth transaction;
wherein data of the second data portion of the volume is modified according to the fourth instruction, wherein the second data portion of the volume is overwritten with the second data portion copy before data of the second data portion of the volume is modified according to the fourth instruction.

10. A method comprising:
storing a plurality of data transactions in memory;
copying data from a plurality of volume blocks to a plurality of memory blocks, respectively;
modifying data in each of the plurality of volume blocks according to the plurality of data transactions, respectively, wherein data in each of the volume blocks is copied to a respective memory block before modification;
switching the state of a plurality of first bits in memory, wherein the plurality of first bits corresponds to the plurality of volume blocks, respectively;
switching the state of a plurality of second bits in memory, wherein the plurality of second bits corresponds to the plurality of memory blocks, respectively.

11. The method of claim 10 further comprising:
creating a copy of one of the plurality of memory blocks;
modifying data in the copy according to one of the plurality of data transactions.

12. The method of claim 11 further comprising:
overwriting data of one of the plurality of volume blocks with data of a respective memory block, and;
overwriting data of another of the plurality of volume blocks with data of the copy after data of the copy is modified according to one of the plurality of data transactions.

13. The method of claim 10 further comprising:
creating respective copies of data from a subset of the plurality of memory blocks;

modifying data in the copies in accordance with a subset of the plurality of data transactions, respectively.

14. The method of claim 13 further comprising:

overwriting data of a first subset of the plurality of volume blocks with data of respective memory blocks, and;

overwriting data of a second subset of the plurality of volume blocks with data of respective copies after modifying data in the respective copies in accordance with the subset of the plurality of data transactions, respectively.

15. The method of claim 13 further comprising:

switching the state of third bits in memory, wherein the third bits correspond to the copies, respectively.

16. The method of claim 15 further comprising:

overwriting data in volume blocks with data of respective copies if third bits corresponding to the respective copies were switched from one state to the other.

17. The method of claim 16 further comprising:

overwriting data of volume blocks with data of respective memory blocks for each volume block having (1) data which is not overwritten by data of a respective copy and (2) a corresponding first bit with a switched state.

* * * * *